March 21, 1939.   A. G. JACOBSON   2,151,385
LOADING APPARATUS
Filed Nov. 17, 1937   3 Sheets-Sheet 1
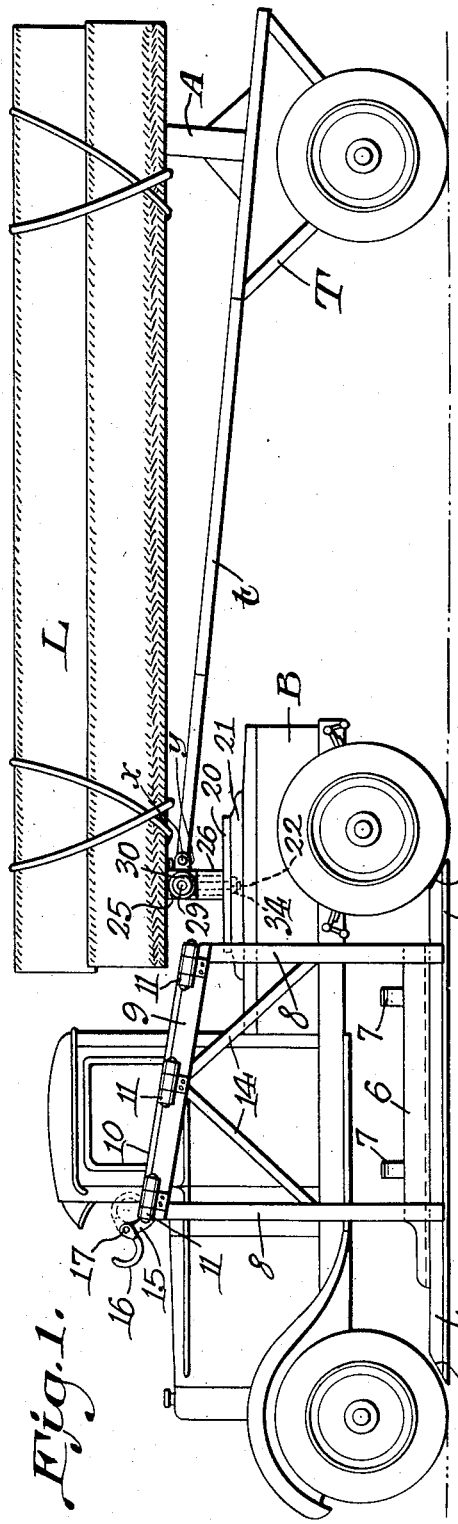
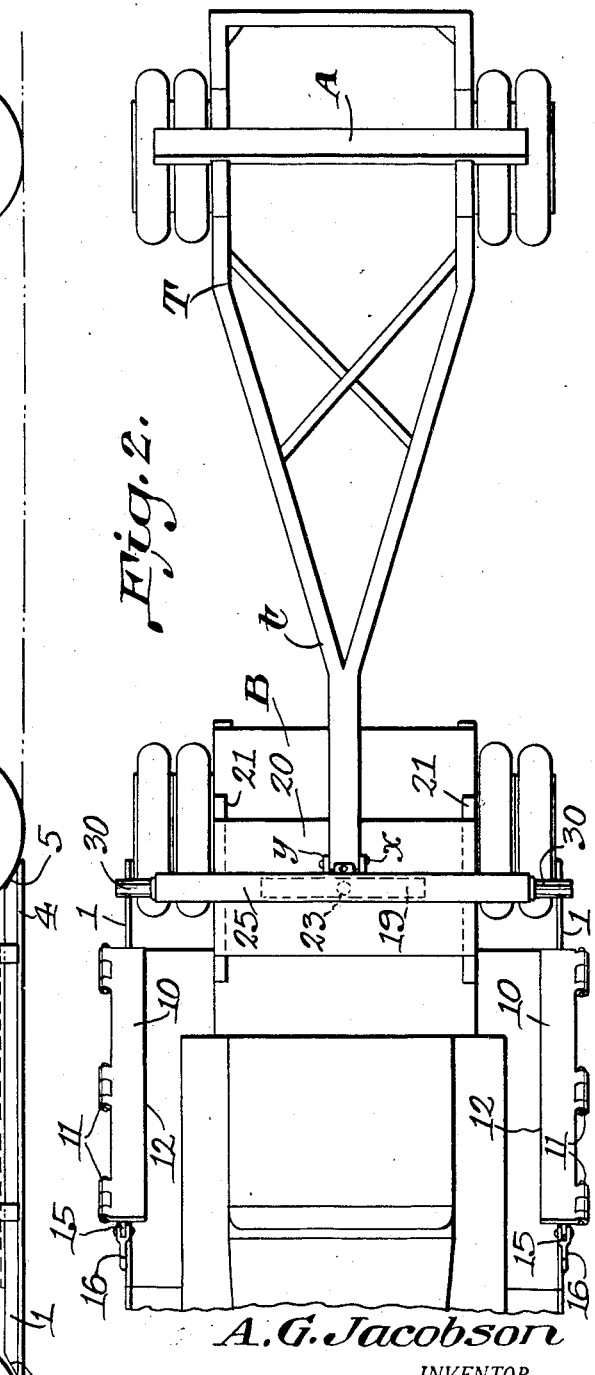
A. G. Jacobson
INVENTOR.
ATTORNEYS.

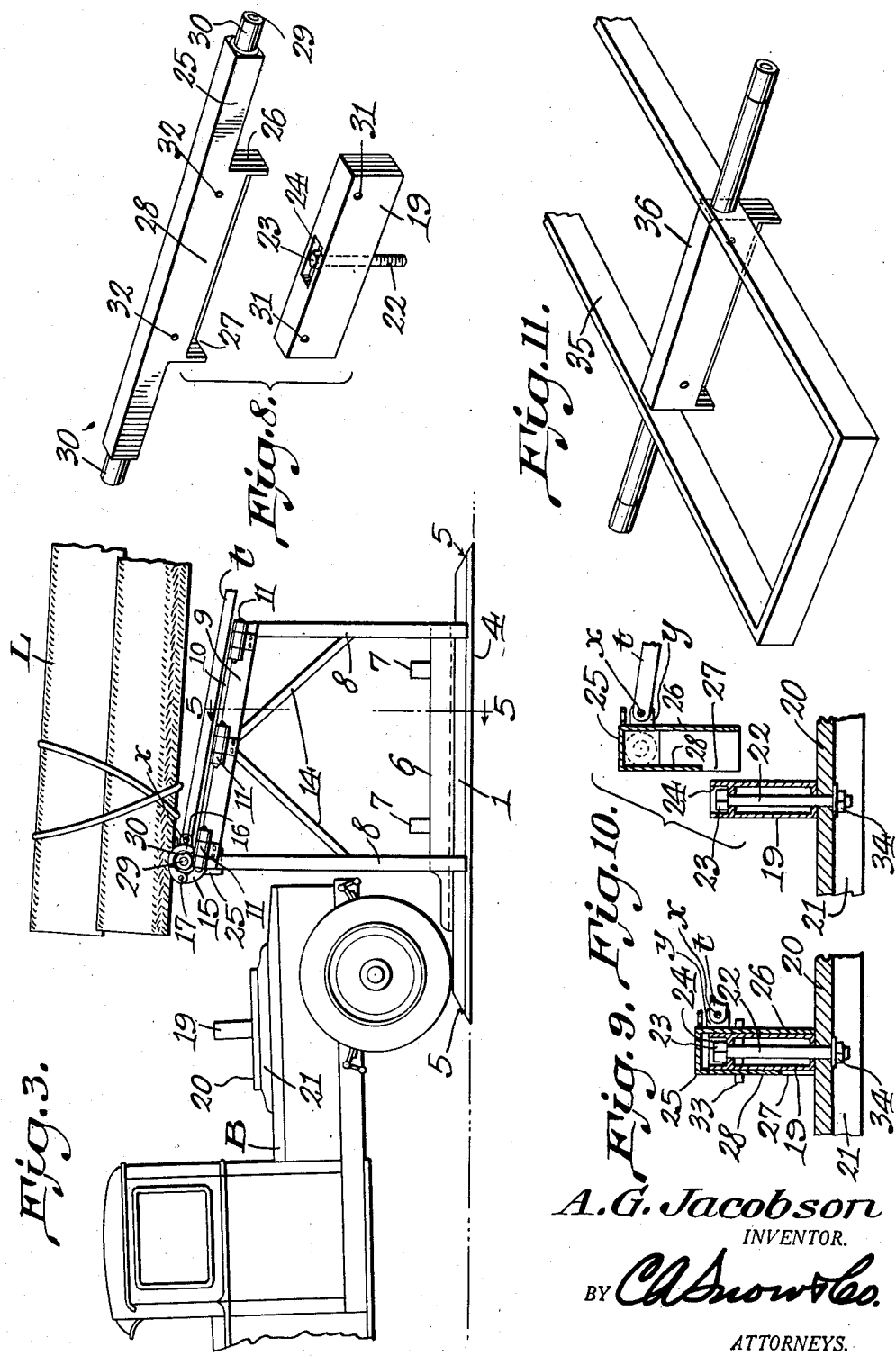

March 21, 1939. A. G. JACOBSON 2,151,385
LOADING APPARATUS
Filed Nov. 17, 1937 3 Sheets-Sheet 3
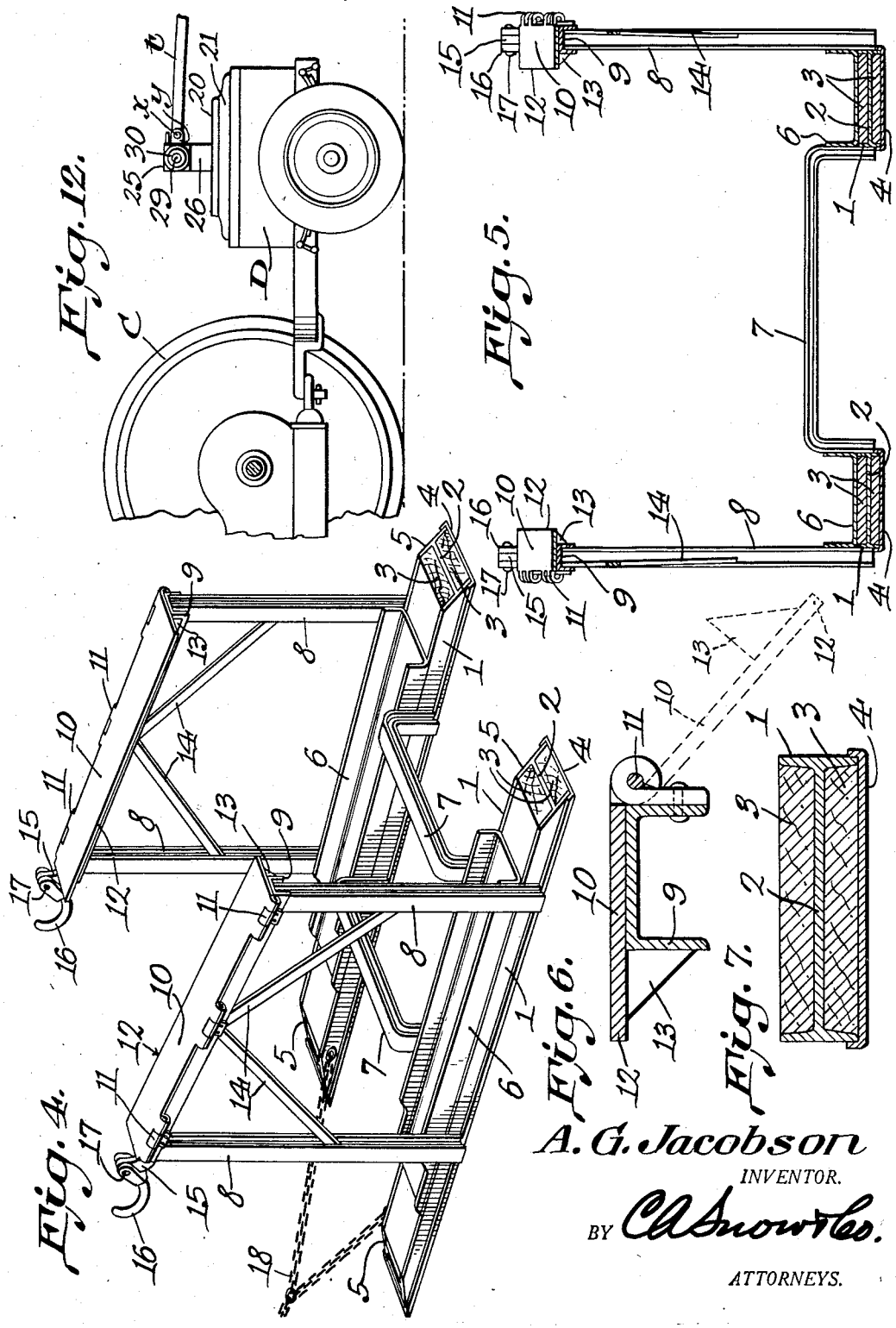
A. G. Jacobson
INVENTOR.
BY CA Snow Co.
ATTORNEYS.

Patented Mar. 21, 1939

2,151,385

UNITED STATES PATENT OFFICE 2,151,385

LOADING APPARATUS

Albin G. Jacobson, Crossett, Ark.

Application November 17, 1937, Serial No. 175,142

12 Claims. (Cl. 254—45)

This invention relates to loading apparatus designed for use in connection with trucks and trailers such as used for hauling logs, poles, piling, and elongated racks or bodies such as commonly employed for holding pulp wood, ties, posts, etc.

It is well known to those skilled in the art that considerable time is lost in truck logging because of the fact that, by methods commonly employed, the truck, with its driver, must remain idle while the truck and trailer are being loaded. Thus the cost of handling logs, etc., has been considerably greater than would be the case if the truck could be kept practically in constant motion moving from the point of loading to the point of delivery without long waits in between.

An object of the present invention is to provide a novel form of loading horse through which a truck can be driven for the purpose of transferring the load between the truck and the horse, there being means on the truck and cooperating with the horse whereby this transfer is made automatic as the truck moves into or out of the horse.

A further object is to utilize means whereby one truck can be used for successively hauling separate trailers, these trailers being used in connection with a horse at the point of loading for the purpose of receiving and supporting the load preparatory to the arrival of the truck while the other trailer is used for transporting another load to the point of delivery.

Another object is to provide a loading horse which can be transported readily from place to place, is of sturdy construction and can be used efficiently for transferring a load to or from a truck or to or from the front section of a twin or four-wheel trailer.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings

Figure 1 is a side elevation of a truck and trailer with a load thereon, the truck being shown within a loading horse in the position occupied either prior to or after the transfer of the load.

Figure 2 is a plan view of the structure shown in Figure 1, a portion of the truck being broken away.

Figure 3 is a side elevation of the loading horse and a portion of the truck showing the positions of the parts after the load has been transferred to the horse or prior to the removal of the load from the horse.

Figure 4 is a perspective view of the loading horse.

Figure 5 is an enlarged section on line 5—5, Figure 3.

Figure 6 is an enlarged transverse section through one of the tracks or transfer rails of the loading horse.

Figure 7 is a vertical transverse section through one of the sills or skids of the loading horse.

Figure 8 is a perspective view of the cooperating bunks, the same being shown spaced apart.

Figure 9 is a vertical transverse section through the bunks in interfitting position for coupling the load to a truck.

Figure 10 is a similar view showing the relative positions of the bunks while supported adjacent to each other prior to being coupled together.

Figure 11 is a perspective view of a bunk forming a part of a rack frame which can be used in lieu of the tongue of a trailer.

Figure 12 is a side elevation of a portion of a tractor with the front section of a four-wheel trailer coupled thereto and carrying a bunk.

Referring to the figures by characters of reference 1 designates I-beams which are spaced apart and parallel, the spaces above and below the web 2 of each I-beam being filled preferably with wood as indicated at 3 while a sheet metal sheathing 4 is preferably extending under the beam and welded thereto. Each of these beams thus constitute an efficient skid and, as shown in Figures 1 and 3 the ends of the skids are preferably beveled so as to converge upwardly as indicated at 5.

Mounted on and secured to the skids are channelled members 6 formed preferably of heavy sheet metal, these members being spaced apart a sufficient distance to permit standard dual tires of a truck to move thereinto after mounting the ends of the skids. These skids are held rigidly connected and properly spaced by cross members 7 preferably in the form of inverted yokes which are welded to the inner sides of the beams 1 and the channeled members 6.

Standards 8 formed of I-beams are joined to the outer sides of the beams 1 and adjacent to the ends of the channeled members 6, a pair of these standards being located at each side of the structure and one standard of each pair being shorter than the other.

Mounted on the standards of each pair and welded thereto is an inverted channeled beam 9 and, as one standard is shorter than the other, this beam is of course supported in an inclined position. A plate 10 is extended throughout the length of each beam 9 and is provided, at its outer side, with hinged connections 11 whereby it is joined to the beam 9. When the plates 10 are in their normal positions upon the tops of the beams 9, they extend toward each other beyond the inner sides of the beams so as to provide overhanging portions 12 and these portions are preferably braced by means of brackets 13 formed integral therewith and adapted to bear laterally against the inner sides of the beams 9.

Standards 8 and beam 9 are reenforced by suitably arranged braces 14 welded or otherwise joined thereto.

A tongue 15 is extended away from the upper end of each beam 9 and has a latch 16 pivotally connected thereto as indicated at 17, this latch being preferably in the form of a hook. Each of these latches is adapted to swing open as shown in Figure 4 or to swing backwardly and downwardly onto the adjacent plate 10 into closed position as shown, for example, in Figure 3.

Chains 18 or the like can be connected to the skids at one end and used as a means whereby the loading horse formed by the parts thus far described can be drawn from place to place.

For the purpose of effecting transfer of a load from the loading horse to a truck or from the truck to the horse, it is essential that cooperating coupling bunks be utilized. Two of these bunks are employed, namely, a lower or false bunk and an upper or main bunk. The lower or false bunk consists preferably of a strong rectangular metal box 19 mounted on a platform 20 which, in turn, is supported on the body B of a truck or the like by means of strips 21 suitably fastened to the body. Bunk 19 is joined to platform 20 by a king-pin 22 extending downwardly through the center of the bunk and having its head 23 preferably fitted in a recess 24 in the top of the bunk. Thus while the lower or false bunk 19 is held in an upstanding position on platform 20, it is also free to rotate upon the king-pin 22.

The main bunk, which is the upper bunk, has been indicated at 25 and includes an elongated beam with a central depending box 26 proportioned to slide freely onto or off of the lower or false bunk 19. This box 26 is open at the bottom and the lower portion of its front wall is cut away as at 27, leaving a depending apron 28. Studs 29 extend from the ends of the bunk and carry rollers 30. This bunk is so proportioned that when it is extended transversely of the loading horse, the rollers 30 will engage the plates 10 so as to travel along the projecting portions 12 thereof.

Openings 31 are extended through the lower or false bunk 19 as shown in Figure 8 and when the two bunks are nested as shown in Figure 9, these openings 31 will register with similar openings 32 formed in the bunk 25. The matching openings are adapted to receive locking pins 33 removably mounted therein.

It is to be understood that a trailer T provided with the usual tongue t is to be used in connection with the apparatus thus far described, this trailer being equipped with the usual transverse bunk A for supporting the load. Tongue t can be pivotally connected to bunk 19 as shown in Figures 1, 2, 3 and 10, it being possible readily to detach the tongue simply by removing the pin x from the tongue t and the projecting ears y on the bunk. Obviously means other than a nut could be used for holding the tongue in place on the king-pin.

It is intended to utilize two trailers where a loading horse such as described is employed. One of these trailers is provided for receiving a load while the truck is drawing the other trailer to and from the point of unloading. It is intended also to use two loading horses, at the point of loading.

The simplest installation requires the use of two horses at the point of loading, one truck and two trailers. While one trailer and its horse-supported bunk 25 is being loaded, the other trailer and its bunk are being transported to and from the point of delivery.

The bunk 25 of the horse and trailer being loaded, is mounted on the upper end portions of the plates 10 where the rollers 30 are embraced and held by the latches 16 as shown in Figure 3. The load is then placed on the bunk 25 and on the trailer standing back of the loading horse. In Figure 3 the front portion of the load, indicated at L, has been shown resting on the bunk while on the horse.

To remove the load from the horse a truck equipped wth a false bunk such as hereinbefore described, is backed into the loading horse so as first to enter between the high standards 8. The upper or main bunk will be held with the open front 27 in position to receive the upper portion of the false bunk 19. Latches 16 are disengaged from the upper or main bunk and as the truck is backed the false bunk will pass under the apron 22 and come into contact with the back wall of extension 26. As before stated tongue t is coupled to the truck and as the truck continues to back into the horse, the false bunk 19 will thrust backwardly against the main bunk so that the trailer and its load will be moved backwardly and at the same time the upper or main bunk, while travelling downwardly along the inclined plates 10, will gradually be lowered into nested position on the false bunk 19. In other words the two bunks will be brought from the position shown in Figure 10 to the position shown in Figure 9. Continued backing of the truck will cause it to move entirely through the horse after the bunks have been properly coupled and thereafter the plates 10 can be swung upwardly and outwardly from the positions shown in Figures 4 and 6 so as to provide ample clearance for the truck to pass entirely through the loading horse and then continue on to the point of unloading. Obviously, if preferred, the truck and the load could be pulled forwardly out of the horse following the coupling of the bunks and the outward movement of the plates 10.

When the truck returns from the point of delivery, it is driven through the loading horse previously loaded at that point and the plates 10 then swung down into their normal or inwardly extended position. As the truck continues to move forward it will pull the bunk 25 to the point where it will contact with the inclined plates 10 and move upwardly therealong until the rollers 30 reach the upper end portions of the plate whereupon the truck is stopped and the latches swung into engagement with the rollers. At this time the two bunks are uncoupled and the truck can be moved forwardly independently of the bunk 25 which thus will be left with its trailer for loading.

Following the release and positioning of the empty trailer and bunk, the truck is backed into the other or loaded horse and the coupling operation already described is repeated, the truck then being driven off with the loaded trailer to the point of delivery while the empty trailer is left for loading at the other horse.

Under some conditions it is desirable to transport a rack for holding small timber such as ties, posts, etc., as well as the pulpwood. Under these conditions, instead of utilizing a trailer with a tongue, the trailer is provided with a rack frame 35 to which the upper or main bunk 36 is connected. This rack frame is coupled to and uncoupled from the truck in the same manner as heretofore explained.

It will also be noted that after the bunks have been coupled in either of the structures heretofore referred to, the pins 33 are inserted into the openings 31 and 32 so as to hold them against relative movement, these pins being removed before the bunks are uncoupled.

Should the nature of the soil be such as to prevent the efficient manipulation of a truck at the point where the load is to be received or delivered, a tractor C could be employed in connection with a four-wheel trailer and the front section of this trailer as shown at D could be provided with a lower or false bunk as shown in Figure 12.

Importance is attached to the fact that the load transporting means which can be the truck or the tractor or the front section of a four-wheel trailer, moves onto the channelled members 6 during the loading and unloading operation so that the loading horse thus is held tightly to the supporting surface thereunder by the weight of the transporting means and during the movement of the upper bunk along the top rails of the horse. Thus there is no danger of the horse being shifted out of proper position during the operation of loading and unloading.

Obviously the dogs or latches used for engaging the upper bunk can be of any preferred construction other than that shown and can be differently located if so desired, it merely being necessary to use latches so shaped and located as to engage the bunk 25 or its rollers, or some other part thereof for the purpose of holding the same against downward movement along the inclined surfaces of the loading horse. It is also to be understood that the structural features of the horse can be varied as to design and engineering details without departing from the invention as claimed.

What is claimed is:

1. The combination with load transporting means, a lower bunk thereon, an upper bunk shaped for nesting engagement with the lower bunk, of means in the path of the upper bunk for moving it out of nesting engagement with the lower bunk during the travel of the transporting means in one direction, and means on the upper bunk and cooperating with the lower bunk for receiving thrust from the lower bunk when moved in the opposite direction and for guiding the upper bunk into nesting engagement with the lower bunk, said guiding means being extended longitudinally of the upper bunk.

2. The combination with load transporting means, a lower bunk thereon, and an upper bunk shaped for nesting engagement with the lower bunk, of means in the path of the upper bunk for moving it out of nesting engagement with the lower bunk during the travel of the transporting means, said means including a loading horse having upwardly inclined rails in the path of the upper bunk and lower rails for supporting the weight of the transporting means during said movement of the upper bunk relative to the lower bunk.

3. The combination with load transporting means and upper and lower interfitting bunks carried thereby, of means in the path of the transporting means for receiving the weight thereof, and means positioned for engaging and elevating the upper bunk during the movement of said transporting means in one direction upon the weight-receiving means.

4. The combination with load transporting means and upper and lower interfitting bunks carried thereby, of means in the path of the transporting means for receiving the weight thereof and engaging and elevating the upper bunk during the movement of said transporting means in one direction, said means including a horse having lower rails for receiving the weight of the transporting means so as to be anchored thereby, and inclined upper rails for receiving the weight of the upper bunk while the lower rails are anchored by the transporting means, and rigid connections between the upper and lower rails.

5. The combination with load transporting means and superposed interfitting separable bunks carried thereby, of a bunk for receiving the transporting means comprising lower rails positioned for receiving the weight of the transporting means so as to be anchored thereby, and a pair of inclined upper rails for engagement by the upper bunk and for lifting said bunk relative to the lower bunk during the movement of the transporting means upon the lower rails.

6. The combination with load transporting means, of superposed detachably connected bunks, a horse for receiving the transporting means, said horse including lower rails positioned for receiving the weight of the transporting means so as to be anchored thereby when moved into the horse, a pair of inclined rails thereabove in the path of the upper bunk for engagement thereby to elevate the upper bunk and detach it from the lower bunk during the movement of the transporting means within the horse and while anchoring the lower rails.

7. The combination with load supporting means, of a lower bunk thereon, an upper bunk, means depending from the upper bunk for up and down sliding engagement with the lower bunk, said means constituting a detachable connection between the bunks, a horse for receiving the transporting means including lower rails for receiving the weight of the transporting means so as to anchor the horse, and inclined upper rails fixedly joined to said lower rails, said upper rails being positioned in the path of the upper bunk for engagement thereby to lift the upper bunk relative to the lower bunk during the movement of the load transporting means within the horse and upon the lower rails.

8. The combination with load supporting means, of a lower bunk thereon, an upper bunk, means depending from the upper bunk for up and down sliding engagement with the lower bunk, said means constituting a detachable connection between the bunks, a horse for receiving the transporting lower rails including means for receiving the weight of the transporting means so as to anchor the horse and inclined upper rails fixedly joined to said lower rails, said upper rails being positioned in the path of the upper bunk for engagement thereby to lift the upper bunk relative to the lower bunk during the movement of the load transporting means within the horse and upon the lower rails, each inclined upper rail including a fixedly supported portion and a plate hingedly joined thereto and normally resting thereon, the said plates being extended toward each other beyond the fixed portion thereunder and swingable laterally from said position.

9. The combination with load transporting means, a lower bunk thereon, an upper bunk, and means detachably connecting the bunks for up and down sliding movement of the upper bunk relative to the lower bunk, of a horse including spaced skids, means thereon for receiving the weight of the transporting means so as to anchor the skids, upper inclined rails spaced apart to receive the load transporting means therebetween and rigidly joined to the skids, said upper rails being positioned for engagement by portions of the upper bunk to elevate and detach said bunk relative to the lower bunk during the movement of the load supporting means in one direction within the horse and over the anchored skids.

10. In apparatus of the class described the combination with an upper bunk, inclined rails for supporting the same, and coupling means depending from the bunk, of load transporting means, and a lower bunk mounted thereon for movement about an upwardly extending axis, said transporting means constituting means for moving the lower bunk into position beneath and against the coupling means to thrust said coupling means along the rails for gravitation into nesting engagement with the lower bunk.

11. The combination with an upper bunk, a box-like extension depending therefrom open at the bottom and front and having a depending apron above the open portion of the front, of inclined rails for supporting the bunk, load transporting means, a lower bunk carried thereby and movable therewith between the rails and into the open front and bottom of the extension on the upper bunk and against the apron, thereby to thrust the upper bunk along the inclined rails for gravitation into nesting engagement with the lower bunk.

12. The combination with an inclined rail, an upper bunk supported thereon, and a depending hollow extension on said bunk open at the bottom and having the lower portion of its front likewise open, of load transporting means movable between the rails, a lower bunk carried thereby and movable through the open front and bottom of said extension and against one wall thereof to transmit thrust to the extension and shift the upper bunk along the rail for gravitation into nesting engagement with the lower bunk.

ALBIN G. JACOBSON.